US012711987B1

(12) United States Patent
Sapozhnikov et al.

(10) Patent No.: US 12,711,987 B1
(45) Date of Patent: Aug. 18, 2026

(54) MAGNETIC RECORDING HEAD HAVING A SENSOR STACK DISPOSED ALONG A STRIPE-HEIGHT DIRECTION

(71) Applicant: Seagate Technology LLC, Fremont, CA (US)

(72) Inventors: Victor B. Sapozhnikov, Minnetonka, MN (US); Mohammed Shariat Ullah Patwari, Edina, MN (US); Taras Grigorievich Pokhil, Arden Hills, MN (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 19/053,936

(22) Filed: Feb. 14, 2025

(51) Int. Cl.
*G11B 11/10* (2006.01)
*G11B 5/60* (2006.01)

(52) U.S. Cl.
CPC .................................. *G11B 5/6082* (2013.01)

(58) Field of Classification Search
CPC ... G11B 5/3912; G11B 5/3906; G11B 5/3999; G11B 2005/0021; G11B 11/10506; G11B 11/1051; G11B 11/10; G11B 11/105; H01F 10/3272; H01F 41/32; H01L 27/226; H01L 27/228; H01L 43/10
USPC ........................................................... 360/59
See application file for complete search history.

(56) References Cited

U.S. PATENT DOCUMENTS

| | | | |
|---|---|---|---|
| 10,068,601 B1 | 9/2018 | Li et al. | |
| 10,614,838 B2 | 4/2020 | Sapozhnikov et al. | |
| 10,614,840 B1 | 4/2020 | Sapozhnikov et al. | |
| 10,714,131 B1 | 7/2020 | Wu | |
| 10,783,907 B1 | 9/2020 | Sapozhnikov et al. | |
| 11,120,933 B1 * | 9/2021 | Tan | H01F 10/3254 |
| 11,205,447 B2 | 12/2021 | Chen et al. | |
| 11,423,929 B1 | 8/2022 | Sapozhnikov et al. | |
| 11,875,828 B2 | 1/2024 | Sapozhnikov et al. | |

* cited by examiner

*Primary Examiner* — Nabil Z Hindi
(74) *Attorney, Agent, or Firm* — Mueting Raasch Group

(57) ABSTRACT

A magnetic recording head having a reader that includes a sensor stack with a free layer and a reference layer disposed above the free layer in the stripe-height direction. A method includes applying a current through the sensor stack while the magnetic recording head is positioned adjacent to a data track of a magnetic storage medium that is rotating, detecting a change in resistance in the sensor stack in response to a magnetic field of the magnetic storage medium; and processing the change in resistance in the sensor stack into data.

20 Claims, 7 Drawing Sheets

AVERAGE MEDIA FIELD IN FL. BIT LENGTH = 50nm

BL = 50nm TRANSVERSE BL = 50nm DOWNTRACK 600
400
200
0
-200
-400
-600

H (Oe)

0 100 200 300

DOWNTRACK (nm)

MAGNETIC RECORDING HEAD HAVING A SENSOR STACK DISPOSED ALONG A STRIPE-HEIGHT DIRECTION

BACKGROUND

The present disclosure relates to a sensor stack of a reader that can be used in magnetic recording heads. There is a continuing need for new readers, which may facilitate an increase of the reader signal-to-noise ratio (SNR) and, therefore, the areal density capability (ADC).

SUMMARY

The present disclosure includes embodiments of a magnetic recording head having an air-bearing surface. The magnetic recording head includes a reader having at least one sensor stack. The sensor stack includes a free layer and at least one reference layer. The free layer has an air-bearing-surface side and a side opposite to the air-bearing surface side. The reference layer is disposed above the side opposite the air-bearing surface side in the stripe-height direction. The reference layer has a first side and a second side opposite to the first side. The first side faces the side opposite to the air-bearing surface side of the free-layer. The sensor stack is disposed along a stripe-height direction from the free layer.

The present disclosure also includes embodiments of a method that includes applying a current through a sensor stack of a reader in a magnetic recording head having an air-bearing surface. The sensor stack includes a free layer and at least one reference layer. The free layer has an air-bearing-surface side and a side opposite to the air-bearing surface side. The reference layer is disposed above the side opposite the air-bearing surface side in a stripe-height direction. The reference layer has a first side and a second side opposite to the first side. The first side faces the side opposite to the air-bearing surface side of the free-layer. The current is applied while the magnetic recording head is positioned adjacent to a data track of a magnetic storage medium that is rotating. The method also includes detecting a change in resistance in the sensor stack in response to a magnetic field of the magnetic storage medium, and processing the change in resistance in the sensor stack into data.

BRIEF DESCRIPTION OF THE DRAWINGS

The discussion below references the following figures, wherein the same reference number may be used to identify the similar/same component in multiple figures. The schematic figures are for illustration purposes and are not necessarily drawn to scale.

DETAILED DESCRIPTION

The present disclosure relates to a sensor stack of a reader that can be used in magnetic recording heads used in perpendicular magnetic recording (PMR), heat-assisted magnetic recording (HAMR), also referred to as thermally-assisted recording (TAR), thermally-assisted magnetic recording (TAMR), energy-assisted magnetic recording (EAMR), etc. In this disclosure the terms "magnetic recording head," "read/write head," "recording head," and "head" are used interchangeably.

A magnetic recording head of a data storage device such as a hard disk drive (HDD) includes a reader and a writer. The reader may be magnetic sensor (a "sensor stack") that operates on magnetoresistance, such as a giant magnetoresistance (GMR) junction or a tunneling magnetoresistance (TMR) junction. A GMR or TMR junction generally includes three or more layers, with at least two of these being magnetic layers (e.g., ferromagnetic, ferrimagnetic, antiferromagnetic). A magnetoresistive magnetic sensor operates on the principal that resistance across the sensor stack changes with relative orientations of the magnetic moments of two or more layers of the sensor stack. That is, a change in external magnetic field, such as a field from a stored data bit on a magnetic storage medium (magnetic disk), may be detected as a change in voltage across or current through a sensor junction, and this change may be processed as a signal to decode the data stored on the magnetic disk. Readers typically include side shields. While the magnetic sensor of a reader is positioned to detect a magnetic field from a data bit on a magnetic disk, the side shields serve to isolate the magnetic sensor from magnetic flux from adjacent data bits, thus improving the signal resolution of the reader.

Figure 2:
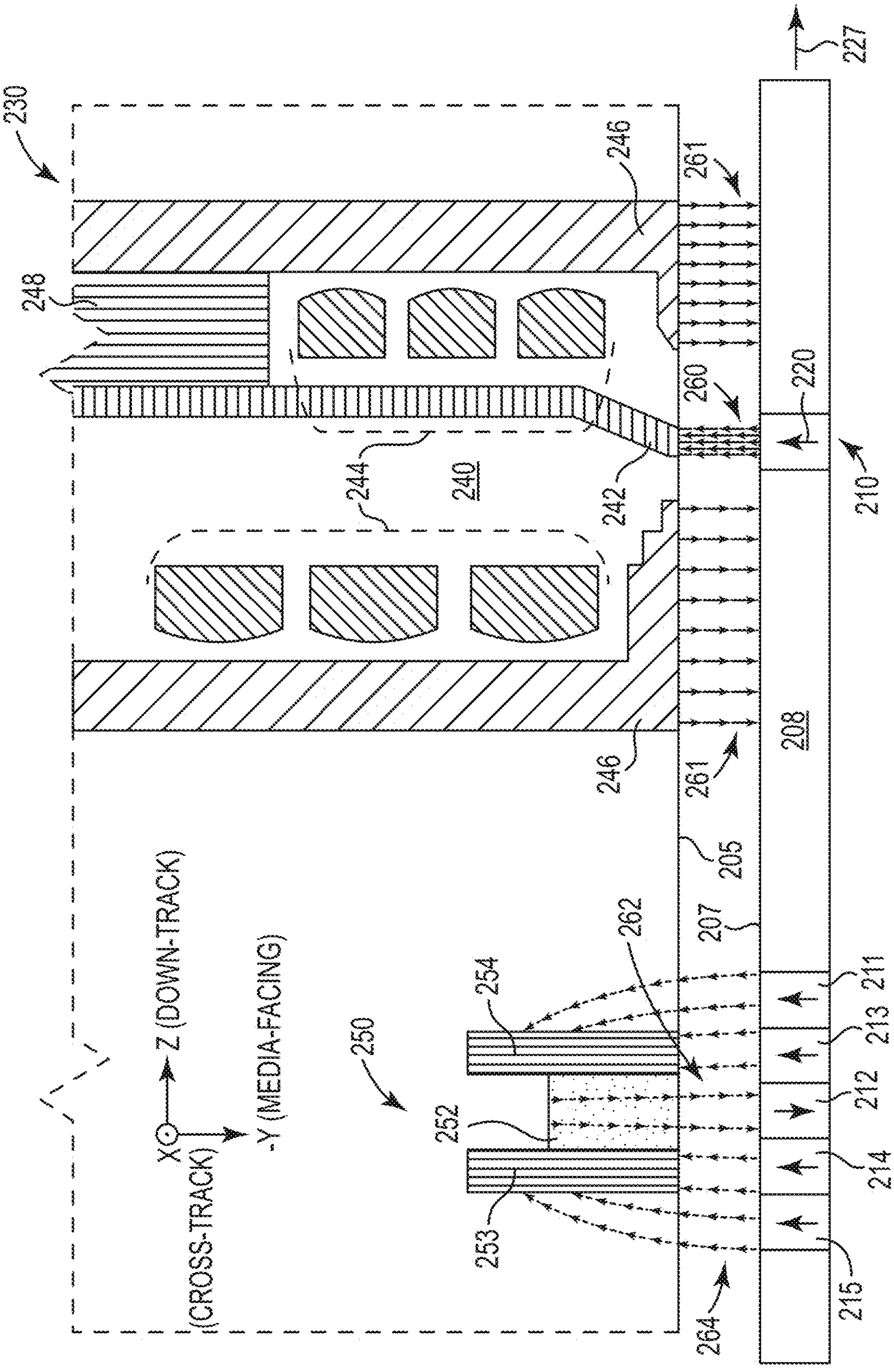
FIG. 2 is a partial, cross-sectional view of an example magnetic recording head and magnetic storage medium, in accordance with aspects of this disclosure.

As used herein, the direction along x-axis is referred to as the cross-track direction; the direction along the y-axis is referred to as the stripe-height direction (the (−)y-axis direction is the media-facing direction); and the direction along the z-axis is referred to as the down-track direction. In more detail, the cross-track direction is perpendicular to the tracks on a magnetic storage medium that underlies and rotates relative to a magnetic recording head. The cross-track direction is aligned with the lateral movement of the magnetic recording head if it switched from writing (or reading) on one track to another. The down-track direction is parallel to the tracks on the magnetic storage medium and is aligned with the rotational motion of the magnetic storage medium. Referring to FIG. 2, magnetic disk 208 rotates in a direction indicated by arrow 227. The media-facing direction points from air-bearing surface 205 of recording head 230 toward the major surface 207 of magnetic disk 208. The stripe-height direction refers to the direction from air-bearing surface 205 into the recording head 230 along the (+) y-axis direction.

Figure 1:
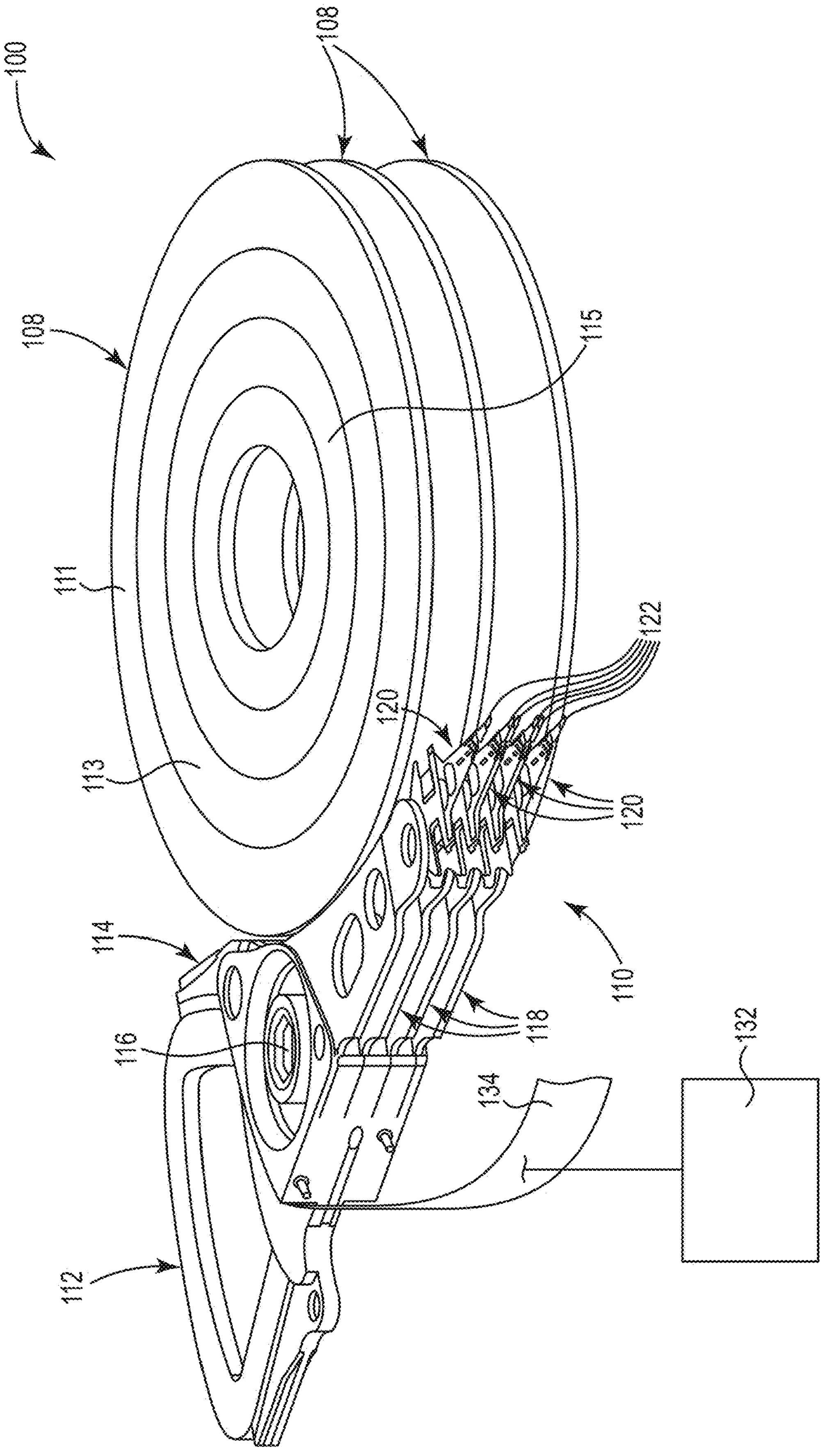
FIG. 1 is a partial, perspective view of an example data storage device, in accordance with aspects of this disclosure.

FIG. 1 is a perspective view of a hard disk drive (HDD) as a non-limiting example of a data storage device, in accordance with aspects of the present disclosure. HDD 100 includes a head stack assembly (HSA) 110 and one or more magnetic disks 108, each being a non-limiting example of magnetic storage medium. Each magnetic storage medium, e.g., magnetic disk 108, is configured to store data in a plurality of data tracks 111, 113, and 115. HSA 110 includes a plurality of head gimbal assemblies (HGA) 120. Each HGA 120 includes a slider 122. Each slider 122 includes a magnetic recording head configured to read data from and write data to a surface of a respective magnetic disk 108. In one example, each magnetic recording head includes a writer, a reader, and a heater (e.g., a reader heater, a writer heater). HDD 100 includes head circuitry 134 that is electrically coupled to a system 132 that includes a controller and memory. The controller is operably connected to each magnetic recording head and configured to control operations of the data storage device. The memory is operably connected to the controller and stores program instructions. The program instructions, when executed by the controller, cause the controller to: apply current through a sensor stack (discussed below) of the magnetic recording head; detect a change in resistance in the sensor stack in response to a magnetic field of the magnetic storage medium; and process the change in resistance in the sensor stack into data.

HSA 110 of FIG. 1 includes a voice coil drive actuator 112. Voice coil drive actuator 112 produces a magnetic field, which exerts a force on an actuator mechanism 114, causing actuator mechanism 114 to rotate about a shaft 116 in either rotational direction. Rotatable drive actuator arms 118 are mechanically coupled to actuator mechanism 114 and to each HGA 120 such that rotating actuator mechanism 114 causes rotatable drive actuator arms 118 and HGAs 120, and thus sliders 122, to move relative to magnetic disks 108.

FIG. 2 is a cross-sectional view of a non-limiting example of a magnetic recording head, in accordance with aspects of the present disclosure. Magnetic recording head 230 includes a writer 240 and a reader 250. Magnetic recording head 230 is disposed proximate to a magnetic disk 208 during read and write operations of an HDD (e.g., HDD 100 of FIG. 1). In the example of FIG. 2, air-bearing surface 205 of magnetic recording head 230 is held proximate to and faces magnetic disk 208. In some examples, air-bearing surface 205 is an air-bearing surface configured to maintain recording head 230 at a target spacing (e.g., a head-media spacing) from a surface of magnetic disk 208 during some operations of HDD 100.

Writer 240 includes a write pole 242, writer coils 244, return poles 246, and a yoke 248. A drive controller (not shown) may output an electrical current through writer coils 244, which are configured to carry the electrical current and induce a magnetic field in write pole 242. Write pole 242 is configured to emit a magnetic field produced by writer coils 244 toward a surface of a magnetic disk 208. A part of write pole 242 is provided on or proximate to air-bearing surface 205 of recording head 230. The magnetic field may be returned to recording head 230 through return pole(s) 246. The magnetic field returns to recording head 230 through return pole(s) 246 and is then directed back to write pole 242 through a channel such as yoke 248.

Write pole 242 emits a magnetic field that includes a focused (e.g. high flux) magnetic field 260 and an unfocused (e.g. low flux) magnetic field 261. Focused magnetic field 260 is sufficiently strong to orient magnetic fields of grains of small areas of magnetic disk 208 into bits of data which are stored for later retrieval. A stored data bit 210 of magnetic disk 208, for example, has a magnetic moment 220 that aligns with the magnetic orientation of focused magnetic field 260. Unfocused magnetic field 261 is returned to writer 240 through return poles 246 and are not strong enough to orient grains of magnetic disk 208. A magnetic moment 220 of stored data bit 210 and magnetic moments of other data bits may therefore be maintained for later retrieval by reader 250.

Reader 250 includes a sensor stack 252, bottom shield 253, and top shield 254. Reader 250 is configured to sense stored bits of data on magnetic disk 208 and direct signals indicative of the data to electronics (e.g., a controller) of HDD 100 for processing and decoding. Sensor stack 252 is configured to respond to magnetic fields produced by stored bits of data on magnetic disk 208. For example, magnetic disk 208 includes stored data bits 211, 212, 213, 214, and 215 (a plurality of bits of data). Each data bit 211-215 is associated with magnetic moments and magnetic fields, as indicated by the arrows in stored data bits 211-215. For example, the magnetic moment of stored data bit 212 produces a magnetic field 262. In the example of FIG. 2, reader 250 is suspended above (in the +y direction) stored data bit 212, indicating that stored data bit 212 is being read by reader 250 at the time represented in FIG. 2. Sensor stack 252 responds to magnetic field 262 and directs a signal which includes the magnetic orientation data of stored data bit 212 to the HDD electronics (e.g., to a channel). Stored data bits 211 and 213-215, on the other hand, are not aligned below sensor stack 252 and are therefore not intended to be read by reader 250 at the time represented in FIG. 2.

Sensor stack 252 may include a magnetoresistive structure such as a giant magnetoresistance (GMR) junction or a tunneling magnetoresistance (TMR) junction. In these examples, an orientation of a magnetic moment of one or more layers of sensor stack 252 affects a current through and/or a voltage across sensor stack 252. For example, sensor stack 252 may include a free layer in which a magnetic moment of the free layer (e.g., the cumulative magnetic moments of the constituent atoms) rotates in response to an external magnetic field (e.g., magnetic field 262 from stored data bit 212). The relative orientation the magnetic moments of the free layer and one or more other layers of sensor stack 252, such as a synthetic antiferromagnetic (SAF) structure and/or a pinned layer, may change the resistivity of sensor stack 252. Thus, the orientation of a magnetic moment of a stored data bit on magnetic disk 208 may affect the voltage or current that is measured across or through sensor stack 252, such that the voltage and/or current may be processed as data signals by the HDD.

Bottom shield 253 and top shield 254 are configured to block extraneous magnetic fields from reaching sensor stack 252. In this way, sensor stack 252 may better detect and resolve the field from a stored data bit that sensor stack 252 is reading. For example, adjacent stored data bit 215 produces magnetic field 264 that is associated with its respective magnetic moment as indicated by the arrow in stored data bit 215. In some examples, one or both of bottom shield 253 and top shield 254 includes a material with high magnetic permeability, enabling bottom shield and/or top shield 254 to absorb flux from fields such as magnetic field 264. Shielding sensor stack 252 from external magnetic fields and/or magnetic fields associated with adjacent stored data bits may provide reader 250 with higher signal-to-noise ratio (SNR) and may enable reader 250 to better resolve stored data from bits from magnetic disk 208.

Referring back to magnetic field 262, sensor stack 252 can sense a transverse component of magnetic field 262. A "transverse" component of magnetic field 262 refers to the vector component of magnetic field 262 that extends along the y-axis and is orthogonal to the major surface 207 of magnetic disk 208 and perpendicular to air-bearing surface 205. The maximum of the transverse component of magnetic field 262 is produced in the middle of bit 212.

Another component of magnetic field 262 is a "down-track" component, which refers to the vector component of magnetic field 262 that extends along the z-axis and has a maximum at a transition. A "transition" occurs at the boundary between two adjacent bits along a data track (e.g., data track 113) where the magnetization flips direction (e.g., from up to down or vice versa). The transition represents a change from one logical state to another (e.g., from a binary 1 to a 0 or vice versa). The transition represents a change from one logical state to another (e.g., from a binary "1" to a "0" or vice versa). While the sensor stack 252 can sense the transverse/perpendicular component of magnetic field, sensor stack 252 is not used to sense or "read" the down-track component of magnetic field.

Figure 5A:
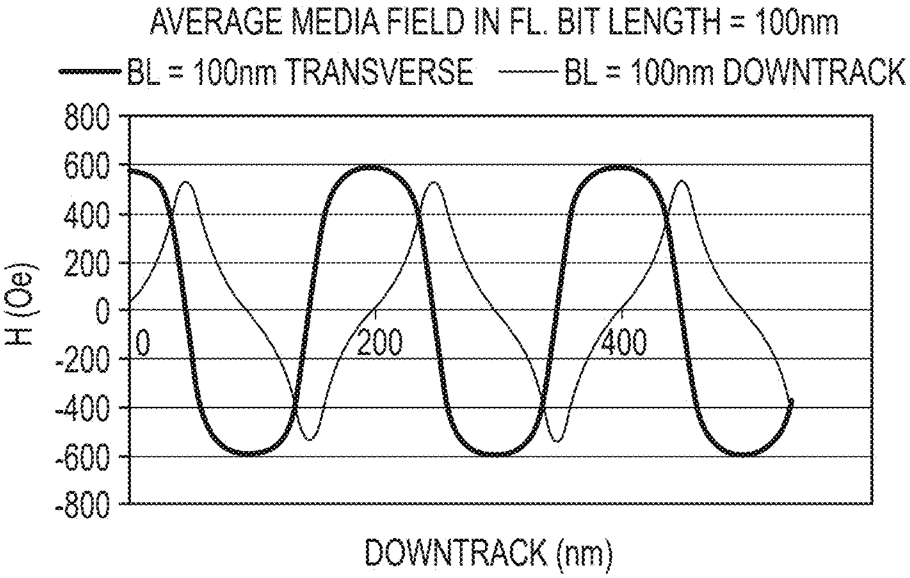
FIG. 5A is a plot of transverse component and down-track component of a magnetic field from magnetic recording medium.
Figure 5B:
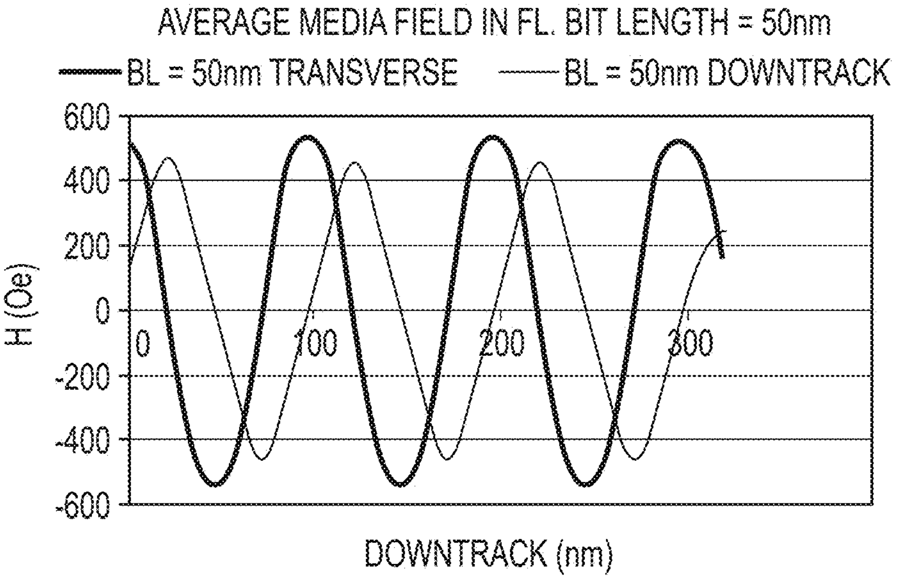
FIG. 5B is another plot of transverse component and down-track component of a magnetic field from magnetic recording medium.

According to the present disclosure, a reader is configured to include at least one additional reference layer located "above" a free layer (FL) in the stripe-height (+ "y") direction. An additional reference layer located "above" the free layer can be part of a sensor stack that operates similar to sensor stack 252 described above, except that, as discussed in detail below, the sensor stack that includes the additional reference layer is used with respect to a down-track component of magnetic field 262. Advantageously, information with respect to the down-track component can be used, for example, to increase the reader SNR and, therefore, the areal density capability (ADC). In the plots of simulated data shown in FIGS. 5A and 5B, the transverse and the down-track magnetic media field components of a train of bits are shown as averaged over the free layer. The down-track component has about the same amplitude as the transverse one, but information is not captured using a sensor stack such as sensor stack 360 (discussed below). Instead, information on down-track magnetic media field component can be captured using a sensor stack 304 or sensor stack 404 (discussed below). While not being bound by theory, it is believed that the SNR gain using sensor stacks 304 or 404 would be similar to that of a Multiple Sensor Magnetic Recording (MSMR) reader, while a sensor stack 304 or sensor stack 404 has an advantage of almost zero "d-spacing" as compared to MSMR. MSMR technology involves using multiple sensors simultaneously to read the same magnetic track on the disk, allowing for higher data density by capturing more information from a smaller area compared to a single sensor reader. For example, MSMR technology can include readers that shifted down-track in respect to each other by "d-spacing". This d-spacing can be a drawback because it can cause the readers to shift cross-track in respect to each other when reading occurs at a skew (inner or outer diameter of the disk, rather than middle).

Figure 3A:
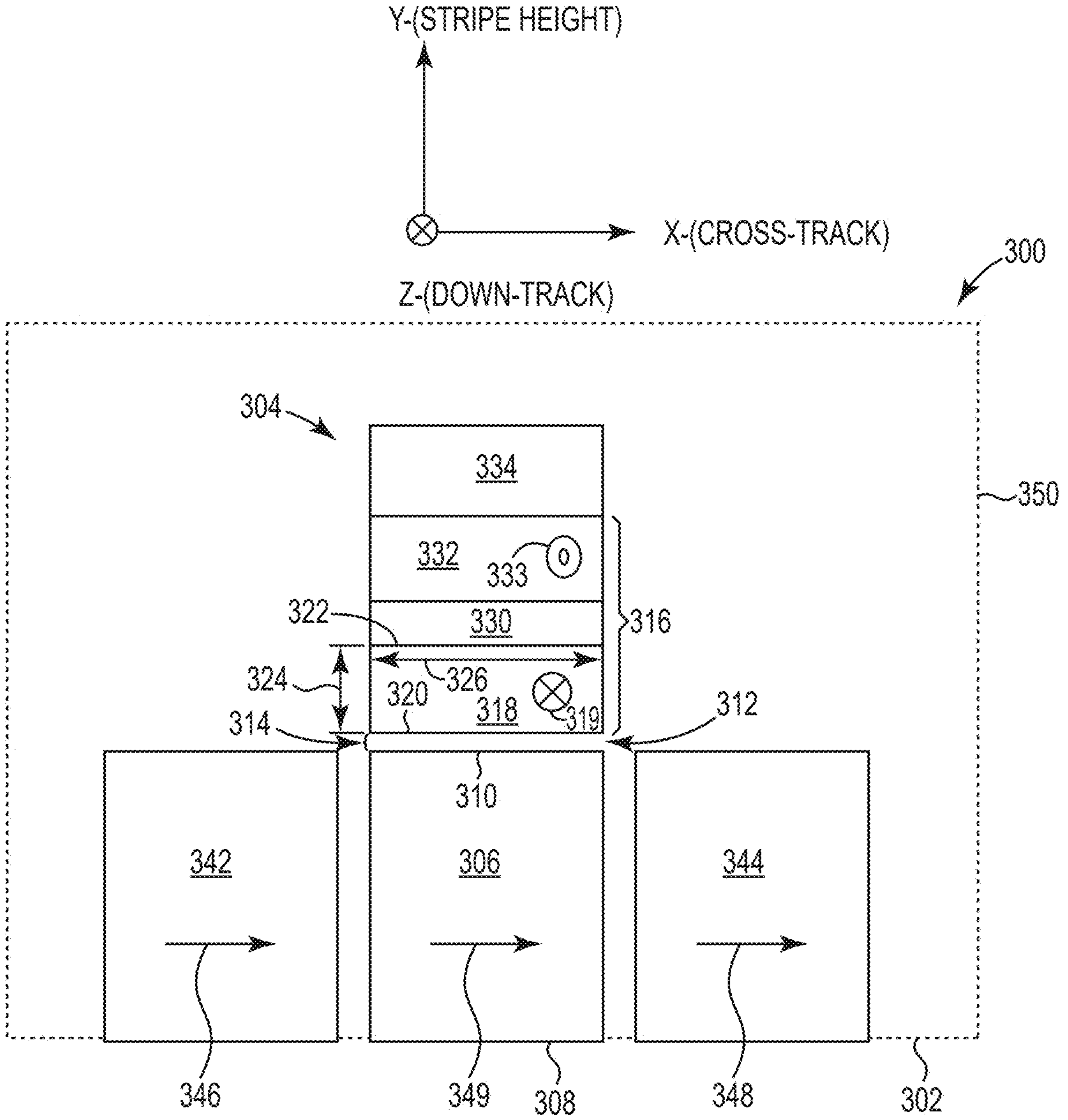
FIG. 3A is a partial, cross-sectional schematic view of an embodiment of a reader that includes a sensor stack according to the present disclosure.

In some embodiments, a magnetic recording head includes a reader having a sensor stack that includes a free layer and at least one reference layer disposed above the free layer in the stripe-height direction. A non-limiting example of a magnetic recording head that includes a reader with an additional reference layer according to the present disclosure is illustrated and described with respect to FIGS. 3A and 3B. As shown in FIG. 3A, a reader 300 of a magnetic recording head includes a sensor stack 304 and an air-bearing surface 302.

Sensor stack 304 is disposed along a stripe-height direction from the free layer 306. A sensor stack may utilize tunneling magnetoresistance (TMR) or giant magnetoresistance (GMR) effects. A sensor stack disposed along a stripe-height direction according to the present disclosure includes at least a free layer such as free layer 306, and a reference layer such as reference layer 318. As shown in FIG. 3A, sensor stack 304 includes free layer 306, spacer layer 312, a synthetic antiferromagnetic structure 316 (SAF structure), and an antiferromagnetic layer 334 (AFM layer).

Free layer 306 is the active sensing layer of reader 300. The magnetic moment 349 rotates freely in response to the external magnetic field from the disk. The degree of rotation determines a resistance change in the sensor stack 304, which is converted into an electrical signal. As shown, free layer 306 has an air-bearing-surface side 308 and a side 310 opposite to the air-bearing surface side 308. Free layer 306 can include a ferromagnetic alloy. Non-limiting examples of a ferromagnetic alloy include CoFe, CoFeB, CoFeNi, and combinations thereof. In some embodiments, free layer 306 can have a thickness from 1 to 10 nanometers, or from 1.5 to 3 nanometers.

As shown in FIG. 3A, sensor stack 304 includes a spacer layer 312 between free layer 306 and reference layer 318. Spacer layer 312 can permit quantum mechanical tunneling of electrons. The electrical resistance of spacer layer 312 depends on the relative magnetization orientations among the free layer 306 and reference layer 318. In some embodiments, spacer layer 312 can be made of magnesium oxide (MgO). In some embodiments, spacer layer 312 can have a thickness 314 in the stripe-height direction of 5 nanometers or less. In some embodiments, spacer layer 312 is a tunnel barrier layer having a thickness in the stripe-height direction from 0.1 to 2 nanometers, from 0.5 to 1.5 nanometers, or even from 0.8 to 1.2 nanometers.

A synthetic antiferromagnetic structure stabilizes a reference layer's magnetization and improves a sensor stack's thermal robustness. As shown in FIG. 3A, synthetic antiferromagnetic structure 316 includes reference layer 318 (RL), separation layer 330, and pinned layer 332 (PL).

A "reference" layer has a magnetic moment 319 and serves as a reference for electrical resistance changes. The reference layer can also work with the free layer to enable the TMR effect. Reference layer 318 disposed above the side 310 (free layer 306 facet) that is opposite the air-bearing surface side 308 in the stripe-height direction. Reference layer 318 includes a 320 and a side 322 that is opposite to the side 320. Side 320 faces the side 310.

Near the transitions (discussed above), the magnetic moment 349 of free layer 306 rotates in the down-track direction (forward and backward) thus changing the angle and the electrical resistance between free layer 306 and reference layer 318. By applying a free layer 306-reference layer 318 bias voltage, an additional signal can be generated from reader 300, as compared to a reader that only includes a sensor stack along the air-bearing surface and the z-axis such as sensor stack 360 (discussed below). In more detail, the electrical resistance of the sensor stack 304 changes in response to an applied magnetic field. Data bits on a magnetic storage medium in a data storage device may be magnetized in a direction normal to the air-bearing surface 302, either in the (+) y-direction or the (−) y-direction. When the sensor stack 304 passes over a transition, the magnetic moment of the free layer 306 is rotated either in the (+) z-direction or the (−) z-direction, changing the electrical resistance of the sensor stack 304, which corresponds to a "down-track" component of the magnetic field at the transition. The value of the down-track component being sensed by the sensor stack 304 may therefore be determined based on the current flowing from one electrode (not shown) to another electrode (not shown) that are connected to the sensor stack 304. It is noted that the normal-to-media (transverse component) magnetic field does not change the angle between free layer 306 and reference layer 318 so the transverse component will not affect the down-track magnetic field signal created between free layer 306 and reference layer 318 to an undue degree, if at all.

In some embodiments, a current is applied through sensor stack 304 of reader 300 in a magnetic recording head while the magnetic recording head is positioned adjacent to a data track (e.g., data track 115) of a magnetic storage medium (e.g., magnetic disk 108) that is rotating. A change in resistance in the sensor stack 304 is detected in response to a magnetic field of the magnetic storage medium. The change in resistance in the sensor stack 304 is processed into data. For example, the detected change in resistance can be converted into an electrical signal proportional to the magnetic field, and the electrical signal can be processed into data. Using sensor stack 304 in this manner can leverage the down-track component (in addition to a transverse component) of the underlying magnetic media field at a transition, which can advantageously improve the reader 300 performance by increasing its SNR.

Figure 4A:
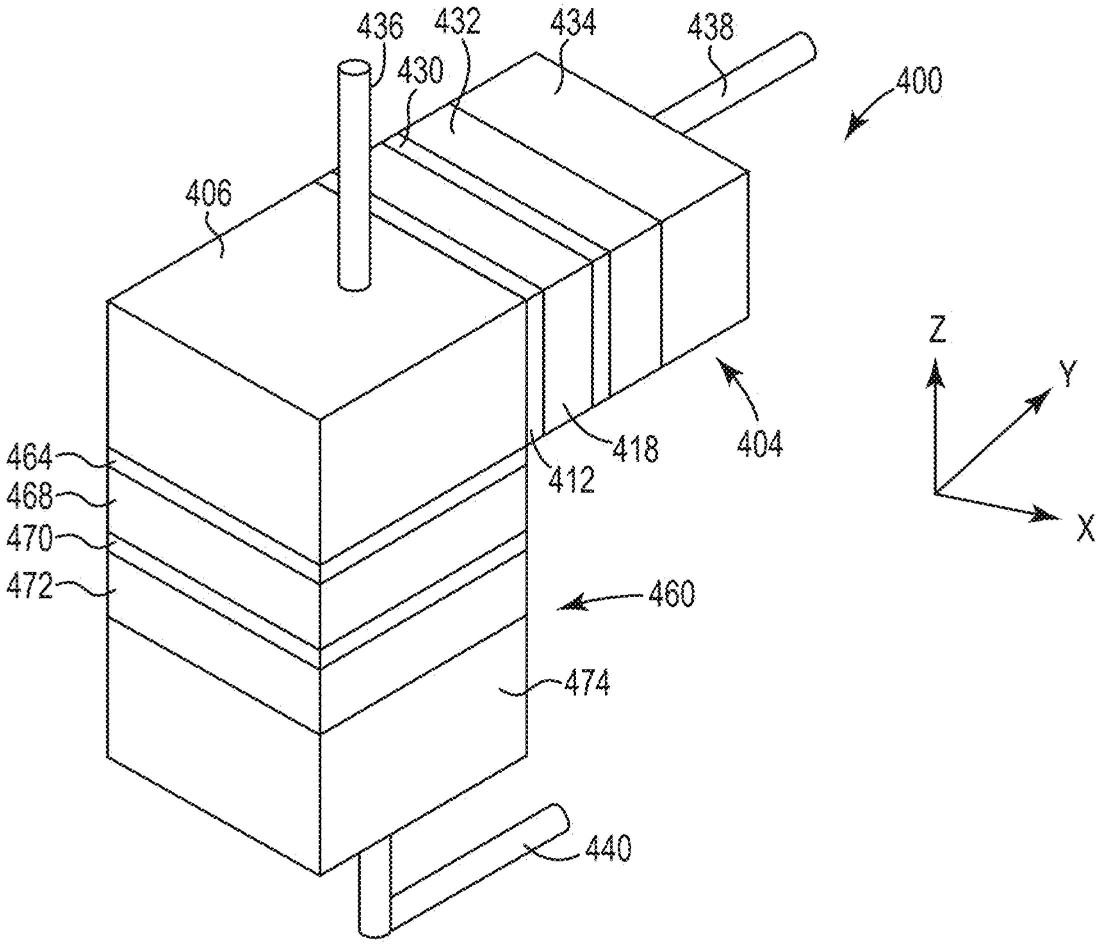
FIG. 4A is a partial, perspective schematic view of another embodiment of a reader that includes a sensor stack according to the present disclosure.
Figure 4B:
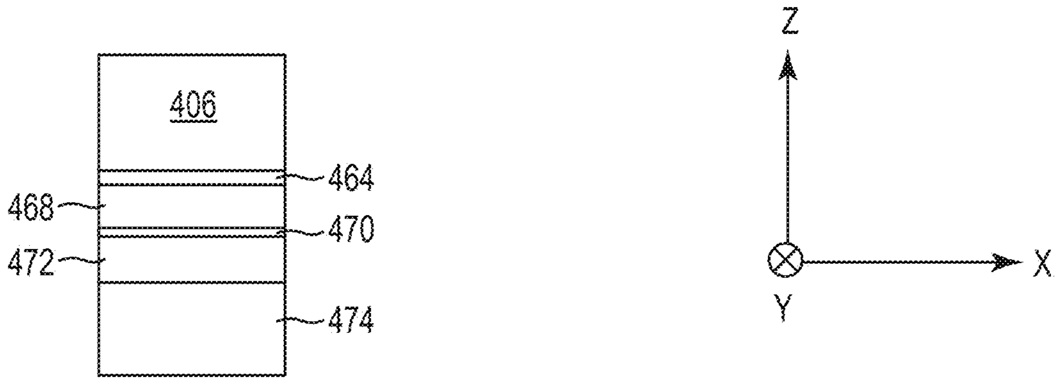
FIG. 4B is a partial, cross-sectional bottom view of the reader in FIG. 4A.
Figure 4C:
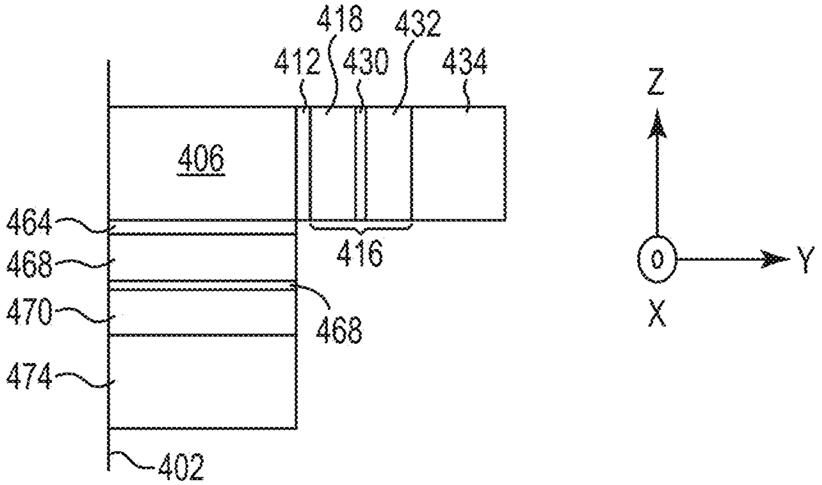
FIG. 4C is a partial, cross-sectional side view of the reader in FIG. 4A.
Figure 4D:
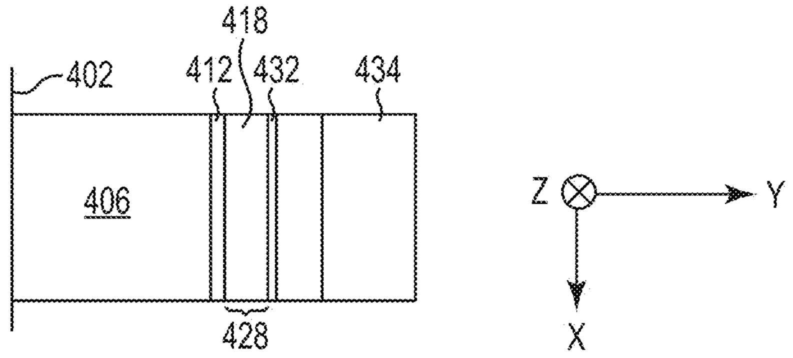
FIG. 4D is a partial, cross-sectional top view of the reader in FIG. 4A.

Reference layer 318 can include a ferromagnetic material. Non-limiting examples of a ferromagnetic material include at least one ferromagnetic material chosen from a cobalt-iron alloy, a cobalt-iron-boron alloy, a nickel-iron permalloy, and combinations thereof. In some embodiments, reference layer 318 can have a thickness 324 in the stripe-height direction from 1 to 6 nanometers, or from 1.5 to 3 nanometers. In some embodiments, reference layer 318 has a width 326 in the cross-track direction from 6 to 30 nanometers. In some embodiments, as shown in FIG. 4D, a reference layer 418 has a length 428 in the down-track direction from 4 to 15 nanometers.

A "separation" layer separates a reference layer and a pinned layer while coupling them antiferromagnetically via RKKY (Ruderman-Kittel-Kasuya-Yosida) exchange coupling. This coupling facilitates the reference layer and the pinned layer having opposite magnetic moments, thereby improving thermal stability. As shown in FIG. 3A, separation layer 330 is disposed between the pinned layer 332 and reference layer 318. In some embodiments, separation layer 330 includes ruthenium (Ru), rhodium (Rh), and combinations thereof. In some embodiments, separation layer 330 has a thickness in the stripe-height direction from 0.5 to 1.5 nanometers.

A "pinned" layer works in conjunction with the reference layer to maintain a stable magnetization direction. The pinned layer's magnetic moment is "fixed" through coupling with an underlying antiferromagnetic layer. As shown in FIG. 3A, pinned layer 332 is disposed above reference layer 318 in the stripe-height direction. Pinned layer 332 can include a ferromagnetic material. Non-limiting examples of a ferromagnetic material include at least one ferromagnetic material chosen from a cobalt-iron alloy, a cobalt-iron-boron alloy, a nickel-iron permalloy, and combinations thereof. In some embodiments, pinned layer 332 can have a thickness in the stripe-height direction from 1 to 4 nanometers, or from 1.5 to 3 nanometers.

The magnetic moment 333 of pinned layer 332 and the magnetic moment 319 of reference layer 318 are essentially fixed and do not rotate to undue degree under magnetic fields in the range of interest (for example, magnetic fields generated by the bits of data stored on the data discs). The magnetic moments 319 and 333 are generally oriented normal to the plane (along the z-direction) of FIG. 3A and are anti-parallel to each other.

An antiferromagnetic layer helps "fix" the magnetic moment of the pinned layer (discussed above) via exchange bias and helps stabilize synthetic antiferromagnetic structure 316 over time. As shown in FIG. 3A, antiferromagnetic layer 334 is disposed above reference layer 318 and pinned layer 332 in the stripe-height direction. In some embodiments, antiferromagnetic layer 334 can include material chosen from an iridium manganese (IrMn) alloy, a platinum manganese (PtMn) alloy, and combinations thereof. In some embodiments, antiferromagnetic layer 334 can have a thickness in the stripe-height direction from 5 to 10 nanometers.

As shown in FIG. 3A, reader 300 also includes side shield 342 and side shield 344. Side shield 342 is disposed in a (−) cross-track direction from the free layer 306, and side shield 344 is disposed in a (+) cross-track direction from the free layer 306. Side shield 342 has a magnetic moment 346 and side shield 344 has a magnetic moment 348 that produce a magnetic field that bias magnetic moment 349 of the free layer 306. As can be seen, magnetic moments 346, 348, and 349 are approximately parallel to the air-bearing surface 302. This bias helps prevent the magnetic moment 349 of the free layer 306 from drifting due to, for example, thermal energy, which may introduce noise into the data sensed by the reader 300. The bias is sufficiently small, however, that the magnetic moment 349 of the free layer 306 can change in response to an applied magnetic field, such as a magnetic field of data bits of a magnetic storage medium.

Figure 3B:
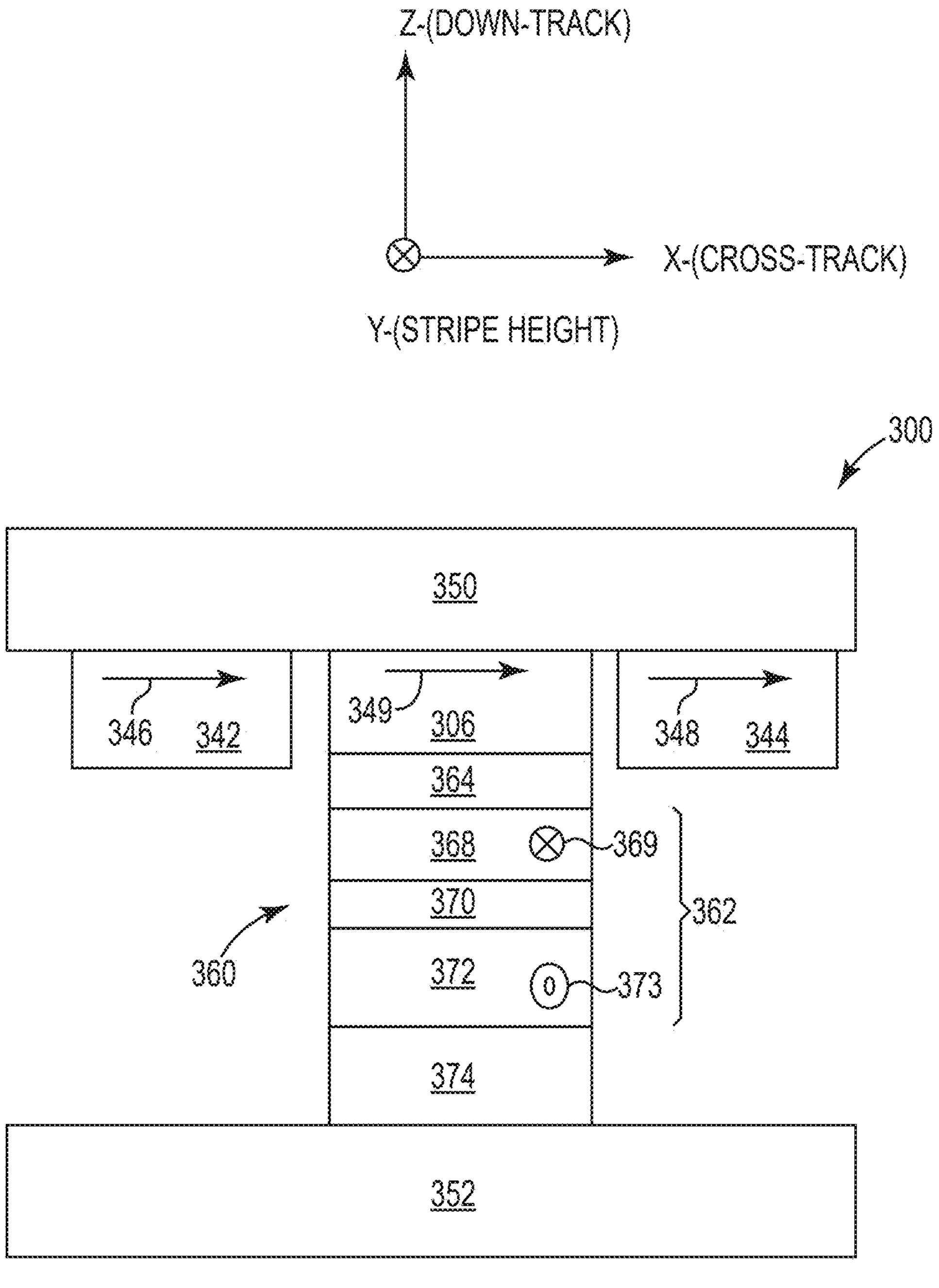
FIG. 3B is a partial, cross-sectional bottom view of the reader in FIG. 3A.

Referring to FIG. 3B, reader 300 also includes a top shield 350, bottom shield 352, and sensor stack 360. Top shield 350 is disposed in a down-track direction from the free layer 306, and bottom shield 352 is disposed in an opposite down-track direction from the free layer 306. Sensor stack 304 and sensor stack 360 a disposed between top shield 350 and bottom shield 352. Each of top shield 350 and bottom shield 352 each help magnetically shield the sensor stack 304 and sensor stack 360 to help each sensor stack focus detection of magnetic field from a desired bit, thereby improving the signal-to-noise ratio. Top shield 350 and/or bottom shield 352 can include material chosen from a cobalt iron (CoFe) alloy, a nickel iron (NiFe) permalloy, and combinations thereof. In some embodiments, top shield 350 and/or bottom shield 352 can have a thickness in the down-track direction from 50 to 200 nanometers.

As shown in FIGS. 3A and 3B, sensor stack 360 includes the same free layer 306 as sensor stack 304. Sensor stack 360 also includes spacer layer 364, synthetic antiferromagnetic structure 362, and antiferromagnetic layer 374. Synthetic antiferromagnetic structure 362 includes reference layer 368, separation layer 370, and pinned layer 372. The individual layers of sensor stack 360 are similar to sensor stack 304, discussed above, and are not repeated here. As explained herein, sensor stack 304 is at a different location in the reader 300 of the magnetic recording head as compared to sensor stack 360 to help capture information about the down-track component of the underlying magnetic field from the magnetic recording medium.

The magnetic moment 373 of pinned layer 372 and the magnetic moment 369 of reference layer 368 are essentially fixed and do not rotate to undue degree under magnetic fields in the range of interest (for example, magnetic fields generated by the bits of data stored on the data discs). The magnetic moments 369 and 373 are generally oriented normal to the plane (along the y-direction) of FIG. 3B and are anti-parallel to each other.

Sensor stack 360 is disposed along the z-axis and may utilize tunneling, magnetoresistance (TMR) or giant magnetoresistance (GMR) effects. In embodiments that utilize TMR effects, spacer layer 364 is a tunneling barrier layer that separates the SAF structure 362 from the free layer 306. The spacer layer 364 is sufficiently thin that quantum mechanical electron tunneling occurs between reference layer 368 in the SAF structure 362 and the free layer 306. The electron tunneling is electron-spin dependent, making the magnetic response of the sensor stack 360 a function of the relative orientations and spin polarizations of the SAF structure 362 and the free layer 306. The highest probability of electron tunneling occurs when the magnetic moments of the reference layer 368 and the free layer 306 are parallel, and the lowest probability of electron tunneling occurs when the magnetic moments of the reference layer 368 and the free layer 306 are antiparallel. Accordingly, the electrical resistance of the sensor stack 360 changes in response to an applied magnetic field. The data bits on the magnetic storage medium in a hard disk drive (HDD) may be magnetized in a direction normal to the plane of FIG. 3B, either in the (+) y-axis direction or in the (−) y-axis direction. Thus, when the sensor stack 360 passes over a data bit, the magnetic moment 349 of the free layer 306 is rotated either in the (+) y-axis direction or in the (−) y-axis direction, changing the electrical resistance of the sensor stack 360. The value of the bit being sensed by the sensor stack 360 (for example, either 1 or 0) may therefore be determined based on the current flowing from a first electrode (not shown) to a second electrode (not shown) connected to sensor stack 360. It is noted that the both the free layer 206/reference layer 318 combination and the free layer 206/reference layer 368 contain signals, as well as time-random noise. Analyzing them in conjunction can produce a higher SNR than an SNR from each of them separately.

Another non-limiting example of a magnetic recording head that includes a reader with an additional reference layer according to the present disclosure is illustrated and described with respect to FIGS. 4A-4D. A reader 400 of a magnetic recording head includes a sensor stack 404, a sensor stack 460, and an air-bearing surface 402. The individual layers of sensor stack 404 and sensor stack 460 are similar to sensor stack 304 and sensor stack 360, respectively, discussed above, and are not repeated here.

Sensor stack 404 is disposed along a stripe-height direction from the free layer 406. Sensor stack 404 includes free layer 406, spacer layer 412, a synthetic antiferromagnetic structure 416 (SAF structure), and an antiferromagnetic layer 434 (AFM layer). Synthetic antiferromagnetic structure 416 includes reference layer 418 (RL), separation layer 430, and pinned layer 432 (PL).

Near the transitions (discussed above), the magnetic moment of free layer 406 rotates in the down-track direction (forward and backward) thus changing the angle and the electrical resistance between free layer 406 and reference layer 418. By applying a free layer 406-reference layer 418 bias voltage, an additional signal can be generated from the reader 400, as compared to a reader that only includes a sensor stack along the air-bearing surface and the z-axis such as sensor stack 460. In more detail, the electrical resistance of the sensor stack 404 changes in response to an applied magnetic field. Data bits on a magnetic storage medium in a data storage device may be magnetized in a direction normal to the air-bearing surface 402, either in the (+) y-direction or the (−) y-direction. When the sensor stack 404 passes over a transition, the magnetic moment of the free layer 406 is rotated either in the (+) z-direction or the (−) z-direction, changing the electrical resistance of the sensor stack 404, which corresponds to a "down-track" component of the magnetic field at the transition. The value of the down-track component being sensed by the sensor stack 404 may therefore be determined based on the current flowing from electrode 436 to electrode 438 that are connected to the sensor stack 404.

Sensor stack 460 includes the same free layer 406 as sensor stack 404. Sensor stack 460 also includes spacer layer 464, synthetic antiferromagnetic structure, and antiferromagnetic layer 474. Antiferromagnetic structure includes reference layer 468, separation layer 470, and pinned layer 472. Sensor stack 460 is disposed along the z-axis. The spacer layer 464 is sufficiently thin that quantum mechanical electron tunneling occurs between reference layer 468 in the SAF structure and the free layer 406. The electron tunneling is electron-spin dependent, making the magnetic response of the sensor stack 460 a function of the relative orientations and spin polarizations of the SAF structure and the free layer 406. The highest probability of electron tunneling occurs when the magnetic moments of the reference layer 468 and the free layer 406 are parallel, and the lowest probability of electron tunneling occurs when the magnetic moments of the reference layer 468 and the free layer 406 are antiparallel. Accordingly, the electrical resistance of the sensor stack 460 changes in response to an applied magnetic field. The data bits on the magnetic storage medium in a hard disk drive (HDD) may be magnetized in a direction normal to the plane of FIG. 4B, either in the (+) y-axis direction or in the (−) y-axis direction. Thus, when the sensor stack 460 passes over a data bit, the magnetic moment of the free layer 406 is rotated either in the (+) y-axis direction or in the (−) y-axis direction, changing the electrical resistance of the sensor stack 460. The value of the bit being sensed by the sensor stack 460 (for example, either 1 or 0) may therefore be determined based on the current flowing from electrode 436 to electrode 440 connected to sensor stack 460.

What is claimed is:

1. A magnetic recording head having an air-bearing surface, wherein the magnetic recording head comprises a reader having at least one sensor stack, wherein the at least one sensor stack comprises:

a free layer having an air-bearing-surface side and a side opposite to the air-bearing surface side, wherein the free layer has a magnetization direction that is free to rotate in response to an external magnetic field associated with recorded data on a magnetic storage medium; and at least one reference layer disposed above the side opposite the air-bearing surface side in a stripe-height direction, wherein the reference layer has a magnetization direction that is substantially fixed against rotation in response to the external magnetic field associated with recorded data on the magnetic storage medium, wherein the at least one reference layer has a first side and a second side opposite to the first side, wherein the first side faces the side opposite to the air-bearing surface side of the free layer, and wherein the at least one sensor stack is disposed along a stripe-height direction from the free layer.

2. The magnetic recording head of claim 1, wherein the at least one reference layer has a thickness in the stripe-height direction from 1 to 6 nanometers.

3. The magnetic recording head of claim 1, wherein the at least one reference layer has a width in a cross-track direction from 6 to 30 nanometers.

4. The magnetic recording head of claim 1, wherein the at least one reference layer has a length in a down-track direction from 4 to 15 nanometers.

5. The magnetic recording head of claim 1, wherein the at least one reference layer comprises at least one ferromagnetic material chosen from a cobalt-iron alloy, a cobalt-iron-boron alloy, a nickel-iron permalloy, and combinations thereof.

6. The magnetic recording head of claim 1, further comprising a spacer layer between the free layer and the at least one reference layer, wherein the spacer layer has a thickness in the stripe-height direction of 5 nanometers or less.

7. The magnetic recording head of claim 6, wherein the spacer layer between the free layer and the at least one reference layer comprises a tunnel barrier layer having a thickness in the stripe-height direction from 0.1 to 2 nanometers.

8. The magnetic recording head of claim 7, wherein the tunnel barrier layer comprises magnesium oxide.

9. The magnetic recording head of claim 1, wherein the at least one reference layer is part of a synthetic antiferromagnetic structure, wherein the synthetic antiferromagnetic structure comprises:
- a pinned layer disposed above the at least one reference layer in the stripe-height direction; and
- a separation layer disposed between the pinned layer and the at least one reference layer.

10. The magnetic recording head of claim 9, further comprising an antiferromagnetic layer disposed above the pinned layer in the stripe-height direction.

11. The magnetic recording head of claim 1, further comprising an antiferromagnetic layer disposed above the at least one reference layer in the stripe-height direction.

12. The magnetic recording head of claim 1, further comprising:
- a first side shield disposed in a cross-track direction from the free layer; and
- a second side shield disposed in an opposite cross-track direction from the free layer and the first side shield, wherein the first side shield and the second side shield each have a magnetic moment that produce a magnetic field that biases a magnetic moment of the free layer.

13. The magnetic recording head of claim 1, wherein the at least one sensor stack is a first sensor stack, and further comprising:
- a top shield disposed in a down-track direction from the free layer;
- a bottom shield disposed in an opposite down-track direction from the free layer and the top shield; and
- a second sensor stack disposed along the opposite down-track direction from the free layer, wherein the second sensor stack comprises:
  - the free layer; and
  - a second reference layer disposed between the free layer and the bottom shield.

14. The magnetic recording head of claim 13, wherein the first sensor stack comprises:
- a first electrode in electrical communication with the free layer;
- a second electrode in electrical communication with first sensor stack so that a current flows through the first sensor stack when a voltage is applied across the first electrode and the second electrode, and wherein the second sensor stack comprises:
- the first electrode; and
- a third electrode in electrical communication with the second sensor stack so that a current flows through the second sensor stack when a voltage is applied across the first electrode and the third electrode.

15. The magnetic recording head of claim 14, wherein the second reference layer is part of a synthetic antiferromagnetic structure, wherein the synthetic antiferromagnetic structure comprises:
- a pinned layer disposed in the opposite down-track direction from the second reference layer; and
- a separation layer disposed between the pinned layer and the second reference layer.

16. The magnetic recording head of claim 15, further comprising an antiferromagnetic layer disposed in the opposite down-track direction from the pinned layer, wherein the antiferromagnetic layer disposed is disposed between the pinned layer and the bottom shield.

17. A data storage device comprising:
- the magnetic recording head of claim 1;
- a magnetic storage medium configured to store data in a plurality of data tracks, wherein each data track comprises a plurality of bits of data, and wherein each bit has an associated magnetic field;
- a controller operably connected to the magnetic recording head and configured to control operations of the data storage device;
- a memory operably connected to the controller, the memory storing program instructions; and
- the program instructions, when executed by the controller, cause the controller to:
  - apply current through the at least one sensor stack of the magnetic recording head;
  - detect a change in resistance in the at least one sensor stack in response to a magnetic field of the magnetic storage medium; and
  - process the change in resistance in the at least one sensor stack into data.

18. A method comprising:
- applying a current through a sensor stack of a reader in a magnetic recording head having an air-bearing surface, wherein the sensor stack comprises:
  - a free layer having an air-bearing surface side and a side opposite to the air-bearing surface side, wherein the free layer has a magnetization direction that is free to rotate in response to an external magnetic field associated with recorded data on a magnetic storage medium; and
  - at least one reference layer disposed above the side opposite the air-bearing surface side in a stripe-height direction, wherein the reference layer has a magnetization direction that is substantially fixed against rotation in response to the external magnetic field associated with recorded data on the magnetic storage medium, wherein the at least one reference layer has a first side and a second side opposite to the first side, wherein the first side faces the side opposite to the air-bearing surface side of the free layer, and wherein applying the current occurs while the magnetic recording head is positioned adjacent to a data track of the magnetic storage medium that is rotating;
- detecting a change in resistance in the sensor stack in response to a magnetic field of the magnetic storage medium; and
- processing the change in resistance in the sensor stack into data.

19. The method of claim 18, wherein processing the change in resistance comprises:
- converting the change in resistance into an electrical signal proportional to the magnetic field; and
- processing the electrical signal into data.

20. The method of claim 18, wherein the sensor stack is a first sensor stack, wherein the magnetic recording head further comprises:

a top shield disposed in a down-track direction from the free layer;

a bottom shield disposed in an opposite down-track direction from the free layer and the top shield;

a second sensor stack comprising a second reference layer disposed in the opposite down-track direction from the free layer, wherein the second reference layer is disposed between the free layer and the bottom shield, and wherein the method further comprises:

applying a current through a second sensor stack of the reader, wherein the second sensor stack comprises the second reference layer, wherein applying the current occurs while the magnetic recording head is positioned adjacent to the data track of a magnetic storage medium that is rotating; and detecting a change in resistance in the second sensor stack in response to a magnetic field of the magnetic storage medium;

processing the change in resistance in the second sensor stack into data.

* * * * *